US010003655B2

(12) United States Patent
Mishra et al.

(10) Patent No.: US 10,003,655 B2
(45) Date of Patent: Jun. 19, 2018

(54) PROVISIONING NETWORK DEVICES BASED ON NETWORK CONNECTIVITY TYPE

(71) Applicant: Verizon Patent and Licensing Inc., Arlington, VA (US)

(72) Inventors: Anurag Kumar Mishra, Temple Terrace, FL (US); Brian E. Stephenson, Weldon Spring, MO (US); Chris F. Sefcik, Richardson, TX (US); William F. Copeland, Richardson, TX (US); Stephen R. Morris, Cary, NC (US); Syed Ammar Ahmad, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 430 days.

(21) Appl. No.: 14/482,929

(22) Filed: Sep. 10, 2014

(65) Prior Publication Data
US 2016/0072894 A1 Mar. 10, 2016

(51) Int. Cl.
*G06F 15/173* (2006.01)
*H04L 29/08* (2006.01)
*H04L 12/24* (2006.01)
*H04L 29/06* (2006.01)

(52) U.S. Cl.
CPC ........ *H04L 67/141* (2013.01); *H04L 41/0806* (2013.01); *H04L 41/5054* (2013.01); *H04L 63/0272* (2013.01); *H04L 67/1002* (2013.01); *H04L 41/12* (2013.01)

(58) Field of Classification Search
CPC ............... H04L 67/141; H04L 41/0806; H04L 41/5054; H04L 63/0272; H04L 67/1002
USPC .......................... 709/223, 224, 226, 217, 220
See application file for complete search history.

(56) References Cited

U.S. PATENT DOCUMENTS

| | | | | |
|---|---|---|---|---|
| 9,693,276 | B1* | 6/2017 | Wuellner | H04L 41/00 |
| 2006/0117020 | A1* | 6/2006 | Toebes | H04L 67/1021 |
| 2009/0257751 | A1* | 10/2009 | Sadananda | H04J 14/0227 398/83 |
| 2012/0239790 | A1* | 9/2012 | Doane | H04L 63/0272 709/220 |
| 2012/0327811 | A1* | 12/2012 | Nozaki | H04L 12/462 370/255 |
| 2013/0091270 | A1* | 4/2013 | Zhang | H04L 41/22 709/224 |
| 2013/0246629 | A1* | 9/2013 | Shao | H04L 63/0272 709/227 |
| 2014/0211648 | A1* | 7/2014 | Rahmati | H04W 48/12 370/252 |
| 2014/0379934 | A1* | 12/2014 | Brooks | H04L 41/0823 709/228 |

(Continued)

*Primary Examiner* — Liangche A Wang
*Assistant Examiner* — Kaylee Huang

(57) ABSTRACT

A device may receive a request to establish a connection between a first device and a second device. The request may include information identifying a network connectivity type. The device may determine one or more network devices to provision based on the network connectivity type; determine, based on the network connectivity type, provisioning parameters used to provision the one or more network devices; and provision the one or more network devices in accordance with the provisioning parameters to establish the connection between the first device and the second device.

20 Claims, 9 Drawing Sheets

(56) References Cited

U.S. PATENT DOCUMENTS

2015/0180796 A1\* 6/2015 Chu .................... H04L 41/0896
    709/226
2015/0263946 A1\* 9/2015 Tubaltsev ............... H04L 45/02
    370/392

\* cited by examiner

| Service Catalog | Network Connectivity Type |
|---|---|
| Generic Private Service | VPC |
| Company A Private Service | VPC |
| Generic Public Service | Public Cloud |
| Generic Dedicated Service | Dedicated VPC |
| Company A Service | Dedicated Non-VPC |
| Company B Service | Dedicated Non-VPC |
| Company A Public | Public Cloud |
| ••• | |
| Service A | |

| Network Connectivity Type | Network Devices and Interfaces to Provision | Provisioning Parameters |
|---|---|---|
| VPC | -Redundant customer interfaces on PIP network devices | Parameter Set 1 |
| Public Cloud | -Redundant customer interfaces on PIP network devices<br>-Customer interfaces on inside and outside firewall network devices | Parameter Set 2 |
| Dedicated VPC | -Redundant customer interfaces on outside and inside aggregation network devices<br>-Customer interface on inside and outside firewall network devices<br>-Redundant customer interfaces on PIP network devices | Parameter Set 3 |
| Dedicated Non-VPC | -Client interface on inside and outside firewall<br>-Redundant client interfaces on PIP network devices<br>-Redundant client interfaces on outside and inside aggregation routers | Parameter Set 4 |

Fig. 4

PROVISIONING NETWORK DEVICES BASED ON NETWORK CONNECTIVITY TYPE

BACKGROUND

When providing a client device with connectivity to a network (e.g., an external network), multiple network devices, of a service provider network associated with the client device, may need to be provisioned in order to create a connectivity path between the client device to the external network.

BRIEF DESCRIPTION OF THE DRAWINGS

FIG. 3 illustrates an example data structure that may store a service catalog and network connectivity types associated with each service in the service catalog;

FIG. 4 illustrates an example data structure that may store a service catalog and network connectivity types associated with each service in the service catalog;

DETAILED DESCRIPTION OF THE PREFERRED EMBODIMENTS

The following detailed description refers to the accompanying drawings. The same reference numbers in different drawings may identify the same or similar elements.

Network devices in a service provider network may need to be provisioned in order to provide a client device, associated with the service provider network, with connectivity to devices within an external network (e.g., a network owned and/or operated by a different service provider). Determining parameters with which to provision the network devices can be time consuming, complex, inaccurate. For example, in order to establish a secure and reliable connectivity path between the client device and the external network, a substantially large quantity of parameters may need to be determined to properly provision the network devices (e.g., an access type, encapsulation type, data transmission speed, Quality of Service (QoS) parameters, routing protocols, etc.).

Systems and/or methods, as described herein, may determine a complete set of parameters with which network devices, of a service provider network, should be provisioned when providing a client device with connectivity to an external network. For example, the complete set of parameters may be determined based on a network connectivity type (e.g., a type of connectivity between the client device and an external network), and based on a reduced set of provisioning information received from a party associated with an external network. As a result, network devices may be provisioned with a greater level of accuracy than when a complete set of provisioning parameters are manually determined. Also, the network devices may be provisioned faster than when the complete set of provisioning parameters are manually determined.

Figure 1:
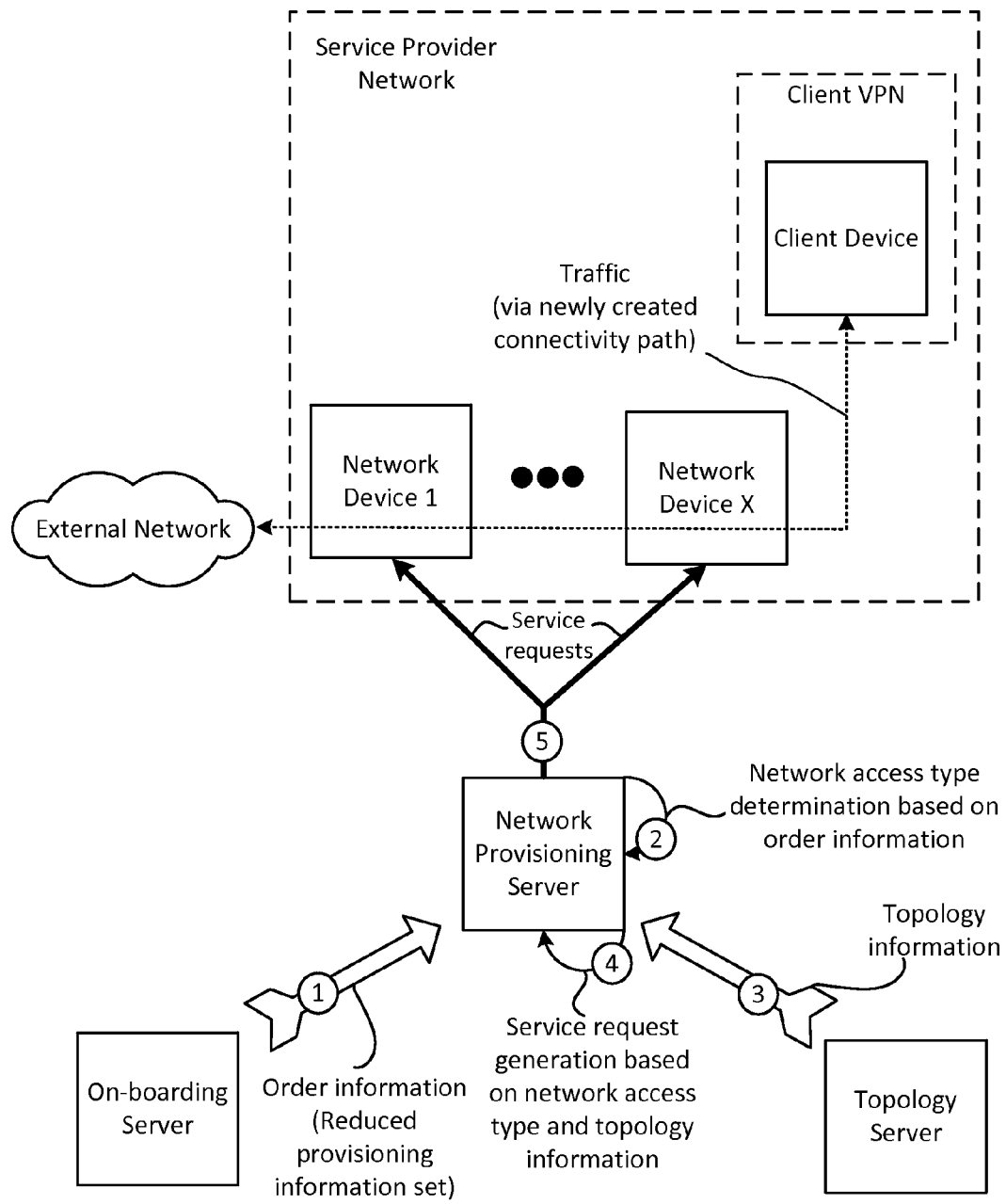
FIG. 1 illustrates an example overview of an implementation described herein.

FIG. 1 illustrates an example overview of an implementation described herein. As shown in FIG. 1, a client device may be part of a service provider network (e.g., a network that provides the client device with network services, such as enterprise network services, network security services, traffic routing services, etc.). In some implementations, the client device may be part of a virtual private network (VPN) within the service provider network. For example, the client device may be part of a VPN associated with a particular organization so that access to the client device may be secured. The service provider network may include network devices (e.g., network devices 1 through X, where X is an integer greater than or equal to 1). The service provider network may serve multiple client devices associated with multiple VPNs.

As further shown in FIG. 1, a network provisioning server may receive order information from an on-boarding server (arrow 1). The order information may include a request to provide connectivity between the client device and an external network (e.g., a different service provider network, such as a network associated with a cloud service, and/or another type of service). The order information may include a reduced set of provisioning information from which a complete set of provisioning parameters may be determined. For example, the order information may include a request to provide connectivity between end points, such as between a particular client device associated with the service provider network, and a particular external network. In some implementations, the order information may further identify a connectivity service that may correspond to different levels of transmission speed, quality, security, and/or service types (a private direct connect service, a public direct connect service, a shared connection service, a hybrid connection service, etc.).

As an example, the order information may originate from a party associated with the company "Company A." The order information may include a request to provide connectivity between end points, such as between a client device associated with a customer of "Company A" and an external network associated with "Company A." The order information may also identify a connectivity service included in the service catalog, such as "Company A Premium Private Cloud Service." This service may be associated with a particular level of transmission speed, quality, security, and/or service type.

Based on the connectivity service defined in the order information, the network provisioning server may determine a network connectivity type (arrow 2). A network connectivity "type," as used herein, may refer to a complete (e.g., default) set of provisioning parameters that may be used to provision the network devices in order to provide connectivity between the external network and the client device in accordance with the ordered connectivity service. For example, one network connectivity type may be associated with one set of provisioning parameters, and a different network connectivity type may be associated with a different set of provisioning parameters.

Based on determining the network connectivity type, the network provisioning server may identify quantities and types of network devices that should be provisioned in order to establish connectivity between the client device and the external network in accordance with the connectivity service. For example, one network connectivity type may require the provisioning of a particular quantity of a particular type of network device, whereas another network connectivity type may require the provisioning of a different quantity of the particular type of network device, or of different types of network devices.

The network provisioning server may further select particular network devices that should be provisioned based on received topology information (arrow 3). For example, the topology information may select network devices, of the determined types, that have available network resources and may be used to establish connectivity between the client device and the external network. Further, the topology information may identify available network addresses that may be used to provide connectivity between the client device and the external network.

The network provisioning server may generate service requests (arrow 4) based on determining the network connectivity type and the received topology information. In some implementations, the service requests may include a complete set of the required provisioning information to generate a connectivity path between the client device and the external network in accordance with the connectivity service. For example, the service requests may identify routing paths, routing protocols, security parameters, QoS parameters, and/or some other provisioning information. The service requests may further include information identifying available addresses based on the topology information (e.g., Internet protocol (IP) addresses via which the client device and the external network should communicate).

The network provisioning server may then output the service requests (arrow 5) to the selected network devices (e.g., available network devices of a particular type) in order to provision the particular network devices in accordance with the complete set of provisioning parameters. Once the selected network devices have been provisioned (e.g., after the selected network devices receive and execute the service requests), traffic may be transmitted between the client device and the external network (e.g., via a connectivity path created when the network devices have been provisioned). In some implementations a VPN may be created as part of the provisioning process. In some implementations, traffic may be transmitted between the external network and the client device via the newly created VPN.

Since the complete set of provisioning parameters may be determined based on the network connectivity type, the full set of provisioning parameters may not need to be manually determined. As a result, a complete set of provisioning parameters may be determined from the information identifying the end points and the information identifying the connectivity service. For example, the complete set of provisioning parameters may identify the endpoints, and may include default parameters associated with the network connectivity type. Since a complete set of provisioning parameters may be determined based on information identifying end points and information identifying a connectivity service, each individual provisioning parameter may not need to be individually determined in order to establish a connectivity path between the end points (e.g., the client device and the external network) in accordance with the connectivity service.

While the systems and/or methods are described as providing connectivity between a client device, associated with a service provider network, and an external network external to the service provider network, the systems and/or methods are not so limited. For example, similar techniques, described herein, may be used to provide connectivity between a client device and a network other than an external network.

Figure 2:
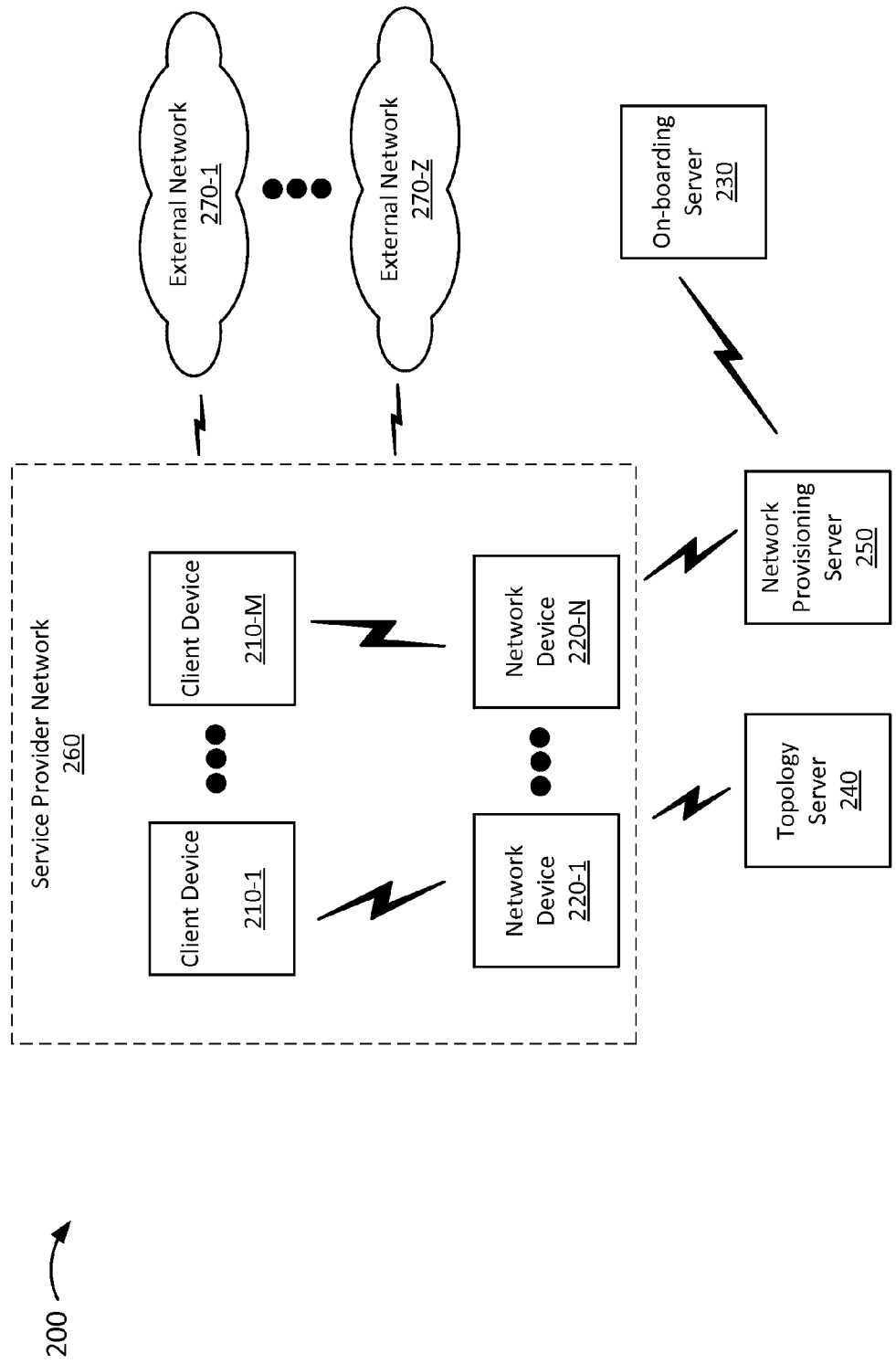
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1 through 210-M (where M is an integer that is greater than or equal to 1, sometimes referred to individually as "client device 210"), network devices 220-1 through 220-N (where N is an integer that is great than or equal to 1, sometimes referred to individually as "network device 220"), on-boarding server 230, topology server 240, network provisioning server 250, service provider network 260, and external networks 270-1 through 270-Z (where Z is an integer that is greater than or equal to 1, sometimes referred to individually as "external network 270").

Client device 210 may include a device capable of communicating via a network, such as service provider network 260, external network 270, and/or other networks. For example, client device 210 may correspond to a server device, a desktop computing device, a laptop computing device, and/or some other computing device. In some implementations, client device 210 may be part of a VPN associated with a particular enterprise, company, and/or organization. Client device 210 may communicate with external network 270 and/or other networks via network devices 220.

Network device 220 may include one or more routers, hubs, bridges, gateways, switches, or the like. Network device 220 may be part of service provider network 260, and may transmit traffic to and/or from client device 210. In some implementations, one or more network devices 220 may provide network services to client device 210 (e.g., traffic routing services, firewall services, security services, etc.). Network devices 220 may receive service requests from network provisioning server 250, and execute the service requests in order to establish a connectivity path between client device 210 and external network 270. In some implementations, network devices 220 may form a VPN as part of the connectivity path. In some implementations, the functionality of multiple network devices 220 may be performed by a single network device 220. Additionally, or alternatively, a single network device 220 may be associated with different network points. For example, a single network device 220 may perform multiple virtual routing and forwarding (VRF) functions, firewall functions, etc.

On-boarding server 230 may include one or more computing devices, such as a server device or a collection of server devices. In some implementations, on-boarding server 230 may output order information to network provisioning server 250. As described above, the order information may include a request to establish connectivity between a particular external network 270 and a particular client device 210. The order information may include a reduced set of provisioning parameters from which a complete set of provisioning parameters may be determined. For example, the order information may identify the particular external network 270, the particular client device 210, a VPN associated with the particular client device 210, and a particular connectivity service.

In some implementations, on-boarding server 230 may store a catalog of connectivity services. In some implementations, a party associated with external network 270 may select a particular connectivity service as part of an order or request to establish connectivity between external network 270 and a particular client device 210. For example, different connectivity services may offer different levels of transmission speed, QoS parameters, connection types, security protocols, routing protocols, etc. Each connectivity service may be associated with a particular network connectivity type from which a complete set of provisioning parameters may be determined.

Topology server 240 may include one or more computing devices, such as a server device or a collection of server devices. In some implementations, topology server 240 may store network topology information regarding service provider network 260. For example, topology server 240 may store information identifying connectivity paths and configurations associated with network devices 220. In some implementations, topology server 240 may store information identifying available network resources and/or available network addresses. Topology server 240 may output topology information to network provisioning server 250.

Network provisioning server 250 may include one or more computing devices, such as a server device or a collection of server devices. In some implementations, network provisioning server 250 may receive order information from on-boarding server 230 (e.g., as part of a request to establish connectivity between client device 210 and external network 270). Network provisioning server 250 may generate service requests in order to establish the connectivity and fulfill a corresponding order. For example, network provisioning server 250 may determine a network connectivity type based on the order information, determine a complete set of provisioning parameters based on the network connectivity type, identify particular network devices 220 to provision (e.g., based on the network connectivity type and topology information stored by topology server 240), generate service requests that include the complete set of provisioning parameters, and output the service requests to network devices 220. In some implementations, the service requests may direct network devices 220 may to form a VPN associated with an order or request to provide connectivity between client device 210 and external network 270.

Service provider network 260 may include one or more wired and/or wireless networks. For example, service provider network 260 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, service provider network 260 may include a local area network (LAN), a wide area network (WAN), a metropolitan network (MAN), the Public Switched Telephone Network (PSTN), an ad hoc network, a managed Internet Protocol (IP) network, a VPN, an intranet, the Internet, a fiber optic-based network, and/or a combination of these or other types of networks. As shown in FIG. 2, service provider network 260 may include client devices 210 and network devices 220.

External network 270 may include one or more wired and/or wireless networks. As an example, external network 270 may include a cloud system with devices that may be provisioned as virtual devices. In some implementations, external network 270 may include a gateway, an edge router, and/or other devices that receive traffic, and forward the traffic to destined virtual devices. External network 270 may include similar components as service provider network 260, such as client devices 210 and network devices 220. In some implementations, devices within external network 270 may perform network address translation (NAT) functions from external IP addresses (e.g., IP addresses that are "visible" to external networks, such as service provider network 260) to private IP addresses (e.g., IP addresses that are "private" with respect to external networks). In some implementations, external network 270 may include another type of system that provides another type of service.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 illustrates an example data structure 300 that may store a service catalog and network connectivity types associated with each service in the service catalog. In some implementations, data structure 300 may be stored in a memory of on-boarding server 230 and/or network provisioning server 250. In some implementations, data structure 300 may be stored in a memory separate from, but accessible by, on-boarding server 230 and/or network provisioning server 250 (e.g., a "cloud" storage device). In some implementations, data structure 300 may be stored by some other device in environment 200, such as client device 210 and/or topology server 240. A particular instance of data structure 300 may contain different information and/or fields than another instance of data structure 300.

Each entry in data structure 300 may identify a particular connectivity service in a service catalog, and a corresponding network connectivity type. The service catalog may identify services with which particular companies or organizations are subscribed. Additionally, or alternatively, the service catalog may identity a generic service. For example, the service "Generic Private Service" may be associated with a particular network connectivity type (e.g., a Virtual Private Cloud (VPC) connectivity type). Similarly, the service "Company A Private Service" may also be associated with the VPC connectivity type.

As shown in FIG. 3, data structure 300 may store multiple different network connectivity types associated with different services in the service catalog. For example, data structure 300 may store the "VPC" network connectivity type, a "Public Cloud" connectivity type, a "Dedicated VPC" network connectivity type, a "Dedicated Non-VPC" connectivity type, and/or another network connectivity type. As described in greater detail below, each network connectivity type may be associated with a different set of complete provisioning parameters.

The "VPC" network connectivity type may refer to a direct, private connection with VRF and a single virtual LAN (VLAN) configuration on redundant network connections between client device 210 and a private network associated with external network 270. The "Public Cloud" network connectivity type may refer to a private connection with VRF and a single VLAN configuration, redundant network connections between client device 210 and a shared connection between external network 270 and service provider network 260. The "Dedicated VPC" network connectivity type may refer to a direct, private connection with VRF and a Q-in-Q VLAN configuration on redundant network connections between client device 210 and a private network associated with external network 270. The "non-dedicated VPC" network connectivity type may refer to private connection with VRF and a Q-in-Q VLAN configuration on redundant network connections between client device 210 and a connection between a private network associated with external network 270 and service provider network 260.

While particular fields are shown in a particular format in data structure 300, in practice, data structure 300 may include additional fields, fewer fields, different fields, or differently arranged fields than are shown in FIG. 3. Also, FIG. 3 illustrates examples of information stored by data structure 300. In practice, other examples of information stored by data structure 300 are possible.

FIG. 4 illustrates an example data structure 400 that may store provision parameters associated with different network connectivity types. In some implementations, data structure 400 may be stored in a memory network provisioning server 250. In some implementations, data structure 400 may be stored in a memory separate from, but accessible by, network provisioning server 250 (e.g., a "cloud" storage device). In some implementations, data structure 400 may be stored by some other device in environment 200, such as client device 210, on-boarding server 230, and/or topology server 240. A particular instance of data structure 400 may contain different information and/or fields than another instance of data structure 400.

Each entry in data structure 400 may identify a particular network connectivity type, particular types of network devices 220 to provision for the network connectivity type, interfaces on network devices 220 to provision, and a complete provisioning set with which to provision network devices 220. For example, data structure 400 may store information indicating that for the "VPC" network connectivity type, customer interfaces on a private IP (PIP) type network device 220 should be provided. Further, data structure 400 may store a complete parameter set (e.g., "Parameter Set 1") identifying the provisioning parameters for the network devices 220. For example, the complete parameter set may identify an access type, encapsulation, traffic transmission speed, types of network addresses (e.g., VLAN, data link connection identifier (DLCI), virtual path identifier (VPI), virtual channel identifier (VCI), etc.), routing protocols, network automation systems (AS) numbers, customer AS numbers, AS override information, point to point IP addresses, traffic profile information, maximum routes information, load sharing information, hub/spoke information, QoS parameters, max prefix information, border gateway protocol (BGP) timer information, traffic shaping information, and/or other provisioning parameters). As further shown in FIG. 4, data structure 400 may identify network devices and interfaces to provision, and corresponding provisioning parameters for a "Public Cloud" network connectivity type, a "Dedicated VPC" network connectivity type, and a "Dedicated non-VPC" network connectivity type.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible. For example, data structure 400 may identify different network connectivity types and/or different network devices and interfaces to provision.

Figure 5:
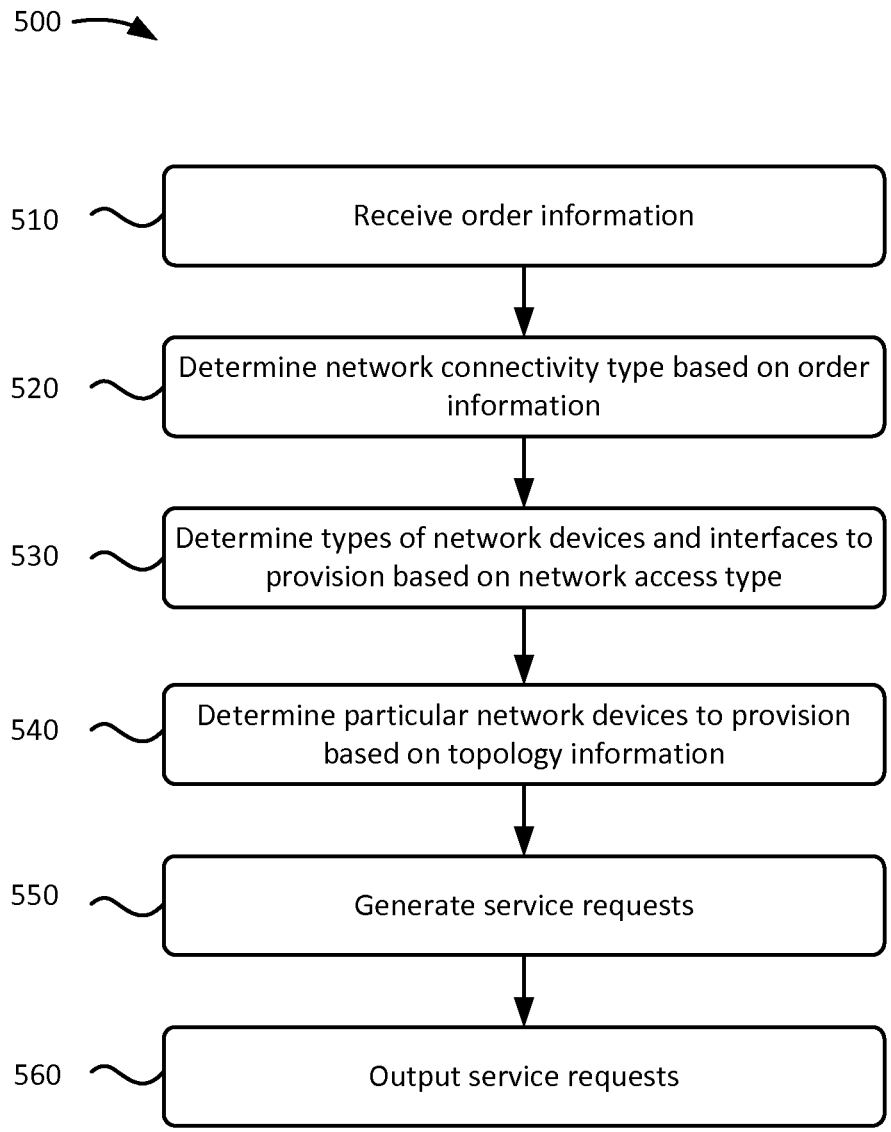
FIG. 5 illustrates a flowchart of an example process for establishing connectivity between a client device and an external network based on a reduced set of provisioning parameters.

FIG. 5 illustrates a flowchart of an example process 500 for establishing connectivity between a client device and an external network based on a reduced set of provisioning parameters. In some implementations, process 500 may be performed by network provisioning server 250. In some implementations, some or all of blocks of process 500 may be performed by one or more other devices.

As shown in FIG. 5, process 500 may include receiving order information (block 510). For example, network provisioning server 250 may receive order information from on-boarding server 230. In some implementations, the order information may include a request to provide connectivity between endpoints, such as between client device 210, and a particular external network 270, or a particular device within external network 270. The order information may also include information identifying a connectivity service. As an example, the order information may originate from a party associated with the company "Company A." The order information may identify the service "Company A Private Service," and may include a request to provide connectivity between client device 210 (e.g., a client device 210 associated with a customer of "Company A") and a device associated with external network 270 (e.g., an external network 270 associated with "Company A.").

Process 500 may also include determining a network connectivity type based on the order information (block 520). For example, network provisioning server 250 may identify the network connectivity type based on the service identified in the order information and based on information stored by data structure 300. In the above example, network provisioning server 250 may identify the network connectivity type as the "VPC" network connectivity type, since the "VPC" network connectivity type is associated with the service "Company A Private Service" as shown in data structure 300.

Process 500 may further include determining types of network devices and interfaces to provision based on the network connectivity type (block 530). For example, network provisioning server 250 may determine types of network devices 220 and interfaces of network devices 220 to provision (e.g., routers, switches, gateways, etc.) based on the network connectivity type and information stored by data structure 400. In the above example, network provisioning server 250 may identify the network devices 220 and the interfaces of network devices 220 to provision based on the "VPC" network connectivity type and information stored by data structure 400. As an example, network provisioning server 250 may determine that redundant customer interfaces on PIP network devices 220 should be provisioned. That is, network provisioning server 250 may determine that redundant interfaces, associated with the client device 210 identified in the order information, on PIP network devices 220 should be provisioned.

Process 500 may also include determining particular network devices to provision based on topology information (block 540). For example, network provisioning server 250 may determine particular network devices 220 to provision based on topology information (e.g., stored by topology server 240) identifying network devices 220 that are available for provisioning (e.g., in order to provide connectivity between a device of external network 270 and client device 210). In the above example, network provisioning server 250 may select PIP network devices 220 that are available for provisioning. Further, network provisioning server 250 may select or determine available network addresses based on the topology information. In some implementations, network provisioning server 250 may select particular network points, implemented by network devices 220, to provision. For example, as described above, a single network device 220 may implement multiple different network points or network functions. Network provisioning server 250 may select particular network points or network functions to provision, whether the network points or network functions are implemented by a single network device 220 or by multiple network devices 220.

Process 500 may further include generating service requests (block 550). For example, network provisioning server 250 may generate service requests based on determining the particular network devices 220 to provision and/or determining particular network functions to provision. In some implementations, the service requests may include a complete set of default provisioning parameters identified in data structure 400 (e.g., provisioning parameters associated with the network connectivity type). For example, the service requests may identify provisioning parameters, such as access type, encapsulation, traffic transmission speed, types of network addresses (e.g., VLAN, DLCI, VPI, VCI, etc.), routing protocols, network AS numbers, customer AS numbers, AS override information, point to point IP addresses, traffic profile information, maximum routes information, load sharing information, hub/spoke information, QoS parameters, max prefix information, BGP timer information, traffic shaping information, and/or other provisioning parameters. In some implementations, the service requests may include a modified set of provisioning parameters. For example, if desired, some provisioning parameters may differ from the default set of provisioning identified in data structure 400. In some implementations, any modifications to the default set of provisioning parameters may be identified in the order information received at process block 510.

The service requests may direct network devices 220 to establish a connectivity path between client device 210 and the device within external network 270 in accordance with the provisioning parameters. In some implementations, the service requests may direct network devices 220 to establish a VPN associated with the connection between client device 210 and the device within external network 270.

Process 500 may also include outputting the service requests (block 560). For example, network provisioning server 250 may output the service requests to network devices 220 in order to provision network devices 220 and establish a connectivity path between client device 210 and the device within external network 270. Based on receiving the service requests, network devices 220 may execute the service requests, thereby creating the connectivity path. As described above, network devices 220 may establish a VPN associated with the connection between client device 210 and the device within external network 270. In some implementations, traffic transmitted between client device 210 and the device within external network 270 may be transmitted via the VPN. As a result, a secure connection may be established between client device 210 and the device within external network 270 without the need to manually determine a complete set of provisioning parameters.

Figure 6:
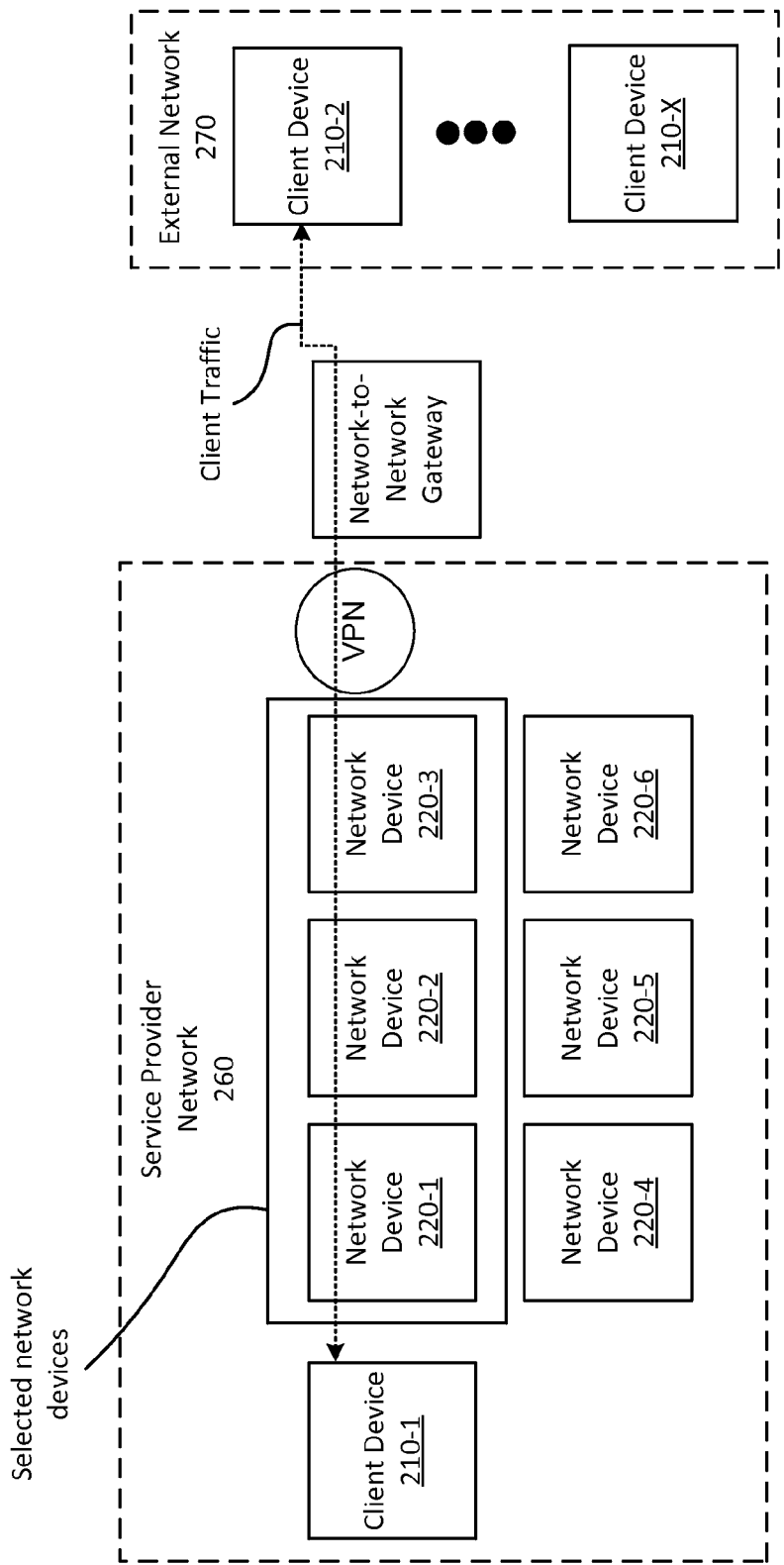
FIG. 6 illustrates an example implementation for transmitting traffic between a client device associated with a service provider network and a client device associated with an external network.

FIG. 6 illustrates an example implementation for transmitting traffic between a client device associated with a service provider network and a client device associated with an external network. As shown in FIG. 6, client traffic may be transmitted between a first client device 210 (e.g., client device 210-1) and a second client device 210 (e.g., client device 210-2). The traffic may be transmitted via a connectivity path that includes selected network devices 220 and a network-to-network gateway. For example, client device 210-1 may transmit traffic via a public IP address, associated with client device 210-2, and the network-to-network gateway may perform network address translation (NAT) functions to route the traffic to client device 210-2 based on a private IP address of client device 210-2 (e.g., a private IP address within external network 270). The selected network devices 210 may be provisioned based on a complete set of provisioning parameters corresponding to a network connectivity type associated with the connection between client device 210-1 and client device 210-2. Once provisioned, the selected network devices 220 may form a VPN associated with the connection between client device 210-1 and client device 210-2. The traffic may be transmitted via the VPN.

Figure 7:
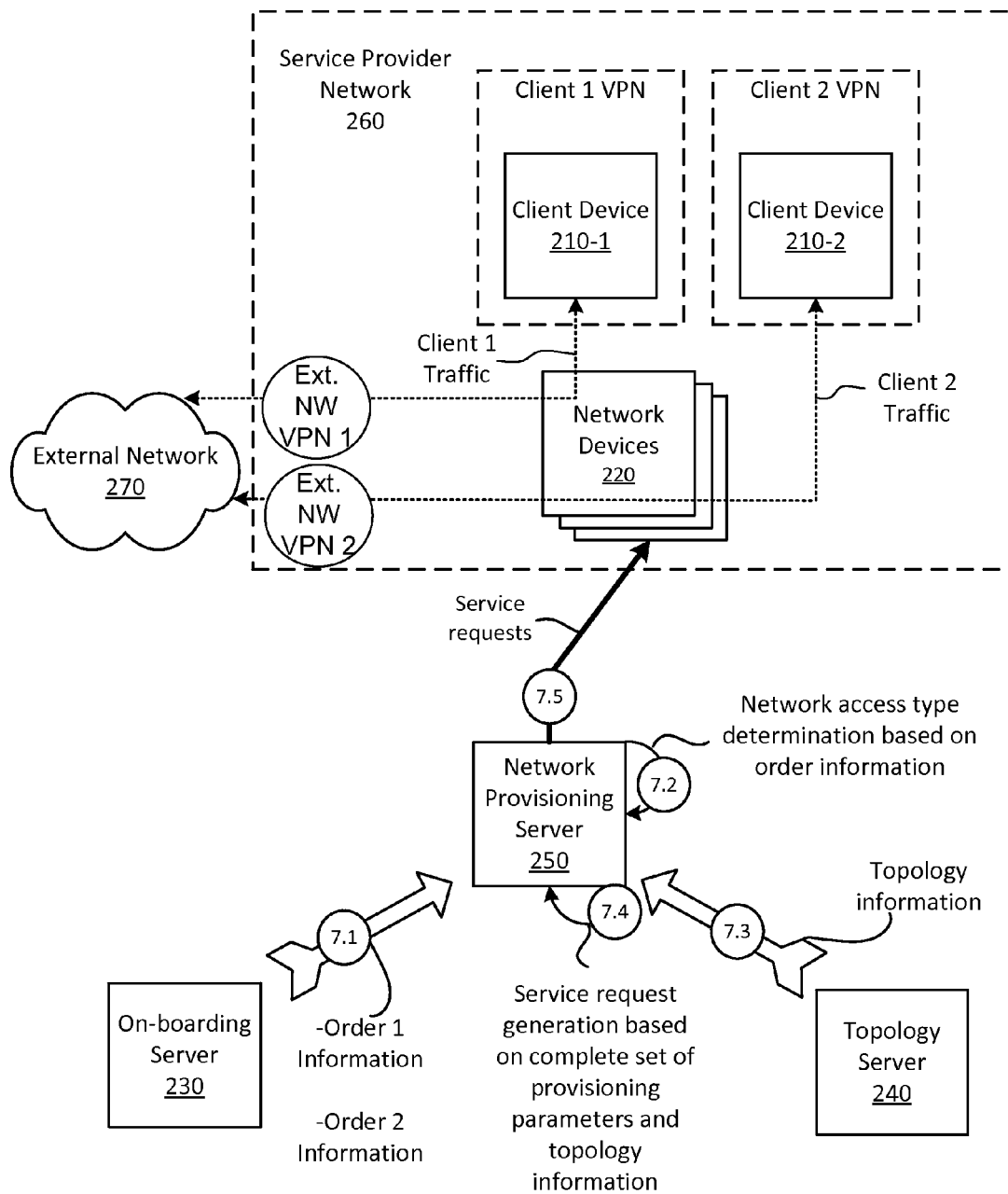
FIGS. 7 and 8 illustrate an example implementation for establishing connectivity between multiple client devices and an external network.
Figure 8:
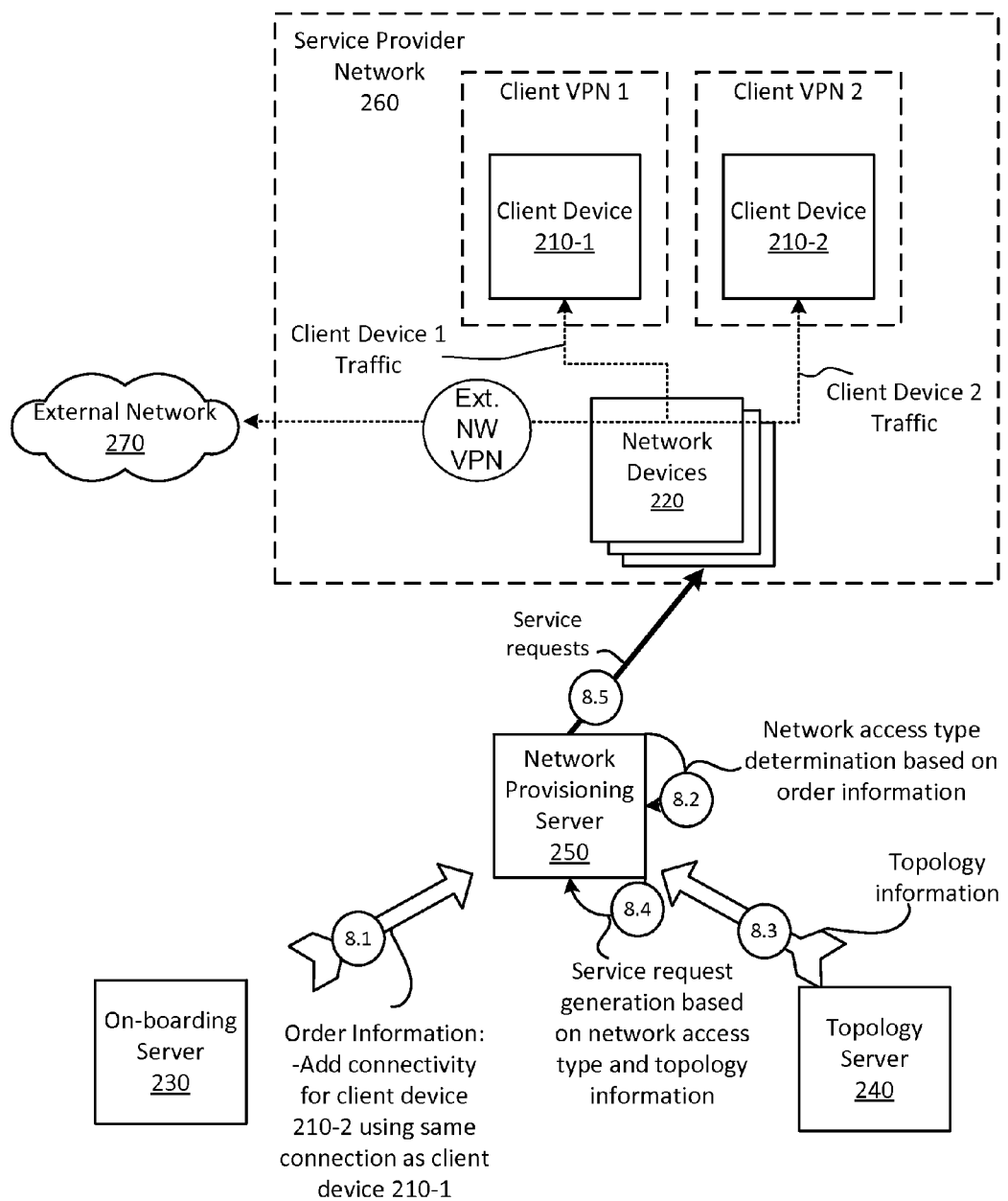

FIGS. 7 and 8 illustrate an example implementation for establishing connectivity between multiple client devices and an external network. As described above, a VPN may be established for each connection associated with an order or request for establishing connectivity between client device 210 and external network 270. As shown in FIG. 7, network provisioning server 250 may receive order information (arrow 7.1) for two orders (e.g. order 1 and order 2). In the example of FIG. 7, order 1 may include a request to establish connectivity between a first client device 210 associated with a first party (e.g., client device 210-1) and external network 270. Order 2 may include a request to establish connectivity between a second client device 210 associated with a second party (e.g., client device 210-2) and external network 270. Orders 1 and 2 may each identify a particular connectivity service. As shown in FIG. 7, client device 210-1 may be part of a first VPN (e.g., "Client 1 VPN"), and client device 210-2 may be part of a second VPN (e.g., "Client 2 VPN").

Based on receiving the order information for order 1, network provisioning server 250 may determine a network access type to determine a complete set of provisioning parameters (arrow 7.2), receive topology information (arrow 7.3) to identify particular network devices 220 to be provisioned, generate service requests based on the complete set of provisioning parameters, (arrow 7.4), and output the service requests (arrow 7.5) to network devices 220. Network devices 220 may execute the service requests to establish a connectivity path between client device 210-1 and external network 270. Network devices 220 may establish a VPN associated with the connectivity path (e.g., external network VPN 1). Traffic between external network 270 and client device 210-1 may be transmitted via external network VPN 1.

Based on receiving the order information for order 2, network provisioning server 250 may determine a network access type to determine a complete set of provisioning parameters (arrow 7.2), receive topology information (arrow 7.3) to identify particular network devices 220 to be provisioned, generate service requests based on the complete set of provisioning parameters, (arrow 7.4), and output the service requests (arrow 7.5) to network devices 220. Network devices 220 may execute the service requests to establish a connectivity path between client device 210-2 and external network 270. Network devices 220 may establish a VPN associated with the connectivity path (e.g., external network VPN 2). Traffic between external network 270 and client device 210-1 may be transmitted via external network VPN 2. As such, a VPN may be established for a connection between client device 210-1 and external network 270 (e.g., a connection associated with order 1), and a different VPN may be established for a connection between client device 210-2 and external network 270 (e.g., a connection associated with order 2). The parameters of the VPNs may be different. Additionally, or alternatively, different network devices 220 of service provider network 270 and/or different quantities of network devices 220 of service provider network 270 may be used for different VPNs. As described in greater detail below, traffic may be transmitted between external network 270 and multiple client devices 210 via a single VPN (e.g., when the multiple client devices 210 are associated with the same party).

Referring to FIG. 8, assume that multiple client devices 210 (e.g., client device 210-1 and client device 210-2), are associated with the same party (e.g., the same company), and that client device 210-1 and client device 210-2 are part of their own respective VPNs. For example, client device 210-1 may be part of a VPN associated with a particular department or organization, and client device 210-2 may be part of a different VPN associated with a different department or organization. Client device 210-1 and client device 210-2 may be part of their own respective VPNs (e.g., client VPN 1 and client VPN 2) so that client device 210-1 and client device 210-2 may not access each other. In FIG. 8, assume that a connection between external network 270 and client device 210-1 has been previously established.

As shown in FIG. 8, network provisioning server 250 may receive order information from on-boarding server 230 (arrow 8.1). The order information may include a request to establish a connection between client device 210-2 and external network 270 using the same external network VPN associated with the connection between client device 210-1 and external network 270. Based on receiving the order information, network provisioning server 250 may determine a network access type to determine a complete set of provisioning parameters (arrow 8.2), receive topology information (arrow 8.3) to identify particular network devices 220 to be provisioned, generate service requests based on the complete set of provisioning parameters, (arrow 8.4), and output the service requests (arrow 8.5) to network devices 220. Network devices 220 may execute the service requests to establish a connectivity path between client device 210-2 and external network 270. Network devices 220 may use the existing external network VPN associated with the connectivity path between external network 270 and client device 210-1. Traffic between external network 270 and client device 210-2 may be transmitted via the external network VPN. As such, external network 270 may communicate with client device 210-1 and client device 210-2 via the same external network VPN. Further, client device 210-1 may not access client device 210-2, and client device 210-2 may not access client device 210-1 since client device 210-1 and client device 210-2 are part of their own respective VPNs. For example, when traffic originates from external network 270 and destined for client device 210-1, network devices 220 may transmit the traffic from external network 270 to client device 210-1 without revealing information regarding the VPN associated with client device 210-2 (e.g., client VPN 2).

In some implementations, additional client devices 210, associated with other VPNs, may be connected to external network 270 via the same connection and the same external network VPN. Also, client devices 210 may be removed from the connection to external network 270. For example, to add an additional client device 210 to the same external network VPN, route targets, associated with a VPN of the additional client device 210, may be added to a VRF associated with the external network VPN. To remove the client device 210 from the connection, the route targets may be removed from the VRF.

Figure 9:
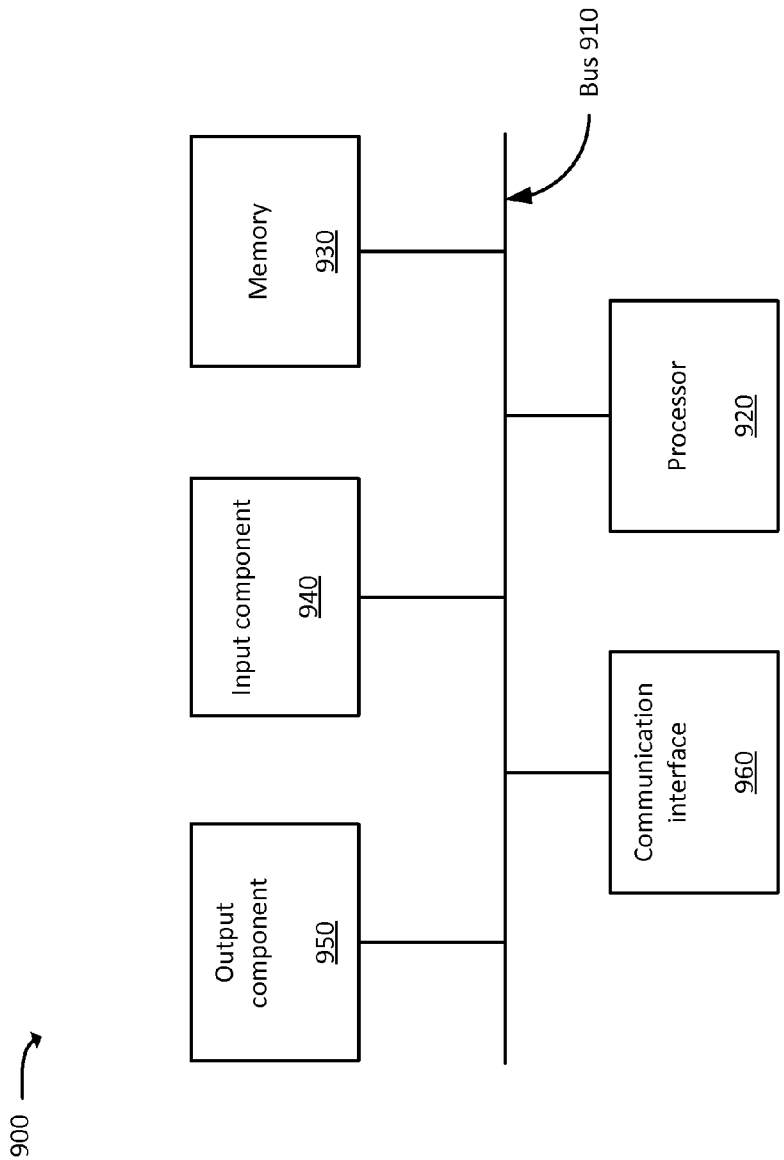
FIG. 9 illustrates example components of one or more devices, according to one or more implementations described herein.

FIG. 9 is a diagram of example components of device 900. One or more of the devices described above (e.g., with respect to FIGS. 1, 2, and 6-8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks have been described with regard to FIG. 5, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, and 6-8), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   storing, by a device, information associating a plurality of network connectivity types with:
      a plurality of sets of provisioning parameters,
      a plurality of sets of types of network devices, and
      a plurality of sets of types of network interfaces,
      wherein each network connectivity type, of the plurality of network connectivity types, is associated with:
         a respective set of provisioning parameters, of the plurality of sets of provisioning parameters,
         a respective set of types of network devices, of the plurality of sets of types of network devices, and
         a respective set of types of network interfaces, of the plurality of sets of types of network interfaces;
   receiving, by the device, a request to establish a connection between a first device and a second device,
      the request including information identifying a particular network connectivity type, of the plurality of network connectivity types;
   determining, by the device, a particular set of provisioning parameters, of the plurality of provisioning parameters, that is associated with the particular network connectivity type, the particular set of provisioning parameters including:
      one or more quality of service ("QoS") parameters, and
      at least three or more of the following parameters:
         traffic profile information,
         a maximum quantity of routes,
         load sharing information,
         hub or spoke information,
         a maximum prefix,
         a border gate protocol (BGP) timer, or
         traffic shaping information;
   determining, by the device, a particular set of types of network devices, of the plurality of types of network devices, that is associated with the particular network connectivity type;
   determining, by the device, a particular set of types of network interfaces, of the plurality of types of network interfaces, that is associated with the particular network connectivity type;
   selecting, by the device, a set of network devices, out of a plurality of candidate network devices, to provision based on the particular network connectivity type, the selecting including:
      determining that the set of network devices is capable of providing a QoS level indicated by the QoS parameters, and
      determining that the set of network devices includes the particular set of types of network devices that is associated with the particular network connectivity type;
   selecting, by the device, a set of network interfaces, out of a plurality of candidate network interfaces, to provision based on the particular network connectivity type, the selecting including determining that the set of network interfaces includes the particular set of types of network devices that is associated with the particular network connectivity type; and
   provisioning, by the device, the selected set of network interfaces and the selected set of network devices in accordance with the particular provisioning parameters, including the QoS parameters, to establish the connection between the first device and the second device.

2. The method of claim 1, wherein provisioning the selected set of network interfaces and the selected set of network devices establishes a virtual private network (VPN) associated with the connection between the first device and the second device.

3. The method of claim 2, wherein the request is a first request, the connection is a first connection, the particular network connectivity type is a first network connectivity type, the particular set of provisioning parameters is a first set of provisioning parameters, the set of network devices is a first set of network devices, and the VPN is a first VPN, the method further comprising:
receiving a second request to establish a second connection between a third device and the second device, the second request including information identifying a second network connectivity type;
determining a second set of provisioning parameters, of the plurality of provisioning parameters, that is associated with the second network connectivity type;
selecting a second set of network devices, out of the plurality of candidate network devices, that are capable of providing the second connection according to the second set of provisioning parameters; and
provisioning the second set of network devices in accordance with the second set of provisioning parameters to establish the second connection between the third device and the second device via a second VPN, the second VPN being different from the first VPN.

4. The method of claim 2, wherein the request is a first request, the connection is a first connection, the particular network connectivity type is a first network connectivity type, the set of network devices is a first set of network devices, and the particular set of provisioning parameters is a first set of provisioning parameters, the method further comprising:
receiving a second request to establish a second connection between a third device and the second device, the second request including information identifying a second network connectivity type;
determining a second set of provisioning parameters, of the plurality of provisioning parameters, that is associated with the second network connectivity type;
selecting a second set of network devices, out of the plurality of candidate network devices, that are capable of providing the second connection according to the second set of provisioning parameters; and
provisioning the second set of network devices in accordance with the second set of provisioning parameters to establish the second connection between the third device and the second device via the VPN.

5. The method of claim 1, wherein the particular set of provisioning parameters further identify:
an access type,
an encapsulation protocol,
traffic transmission speed, and
a communication protocol.

6. The method of claim 1, wherein the particular set of provisioning parameters includes all of the following parameters:
traffic profile information,
the maximum quantity of routes,
load sharing information,
hub or spoke information,
the maximum prefix,
the BGP timer, and
traffic shaping information.

7. The method of claim 1, wherein the second device is associated with a cloud system.

8. The method of claim 1, wherein selecting the set of network devices is further based on network topology information identifying that one or more network devices, of the set of network devices, are of a particular type.

9. A system comprising:
a non-transitory memory device storing:
a plurality of processor-executable instructions, and
information associating a plurality of network connectivity types with:
a plurality of sets of provisioning parameters,
a plurality of sets of types of network devices, and
a plurality of sets of types of network interfaces,
wherein each network connectivity type, of the plurality of network connectivity types, is associated with:
a respective set of provisioning parameters, of the plurality of sets of provisioning parameters,
a respective set of types of network devices, of the plurality of sets of types of network devices, and
a respective set of types of network interfaces, of the plurality of sets of types of network interfaces; and
a processor configured to execute the processor-executable instructions, wherein executing the processor-executable instructions causes the processor to:
receive a request to establish a connection between a first device and a second device,
the request including information identifying a particular network connectivity type, of the plurality of network connectivity types;
determine a particular set of provisioning parameters, of the plurality of provisioning parameters, that is associated with the particular network connectivity type, the set of provisioning parameters including:
one or more quality of service ("QoS") parameters, and at least three or more of the following parameters:
traffic profile information,
a maximum quantity of routes,
load sharing information,
hub or spoke information,
a maximum prefix,
a border gate protocol (BGP) timer, or
traffic shaping information;
determine a particular set of types of network devices, of the plurality of types of network devices, that is associated with the particular network connectivity type;
determine a particular set of types of network interfaces, of the plurality of types of network interfaces, that is associated with the particular network connectivity type;
select a set of network devices, out of a plurality of candidate network devices, to provision based on the network connectivity type, the selecting including:
determining that the set of network devices is capable of providing a QoS level indicated by the QoS parameters, and
determining that the set of network devices includes the particular set of types of network devices that is associated with the particular network connectivity type;
select a set of network interfaces, out of a plurality of candidate network interfaces, to provision based on the particular network connectivity type, the selecting including determining that the set of network interfaces includes the particular set of types of network devices that is associated with the particular network connectivity type; and
provision the selected set of network interfaces and the selected set of network devices in accordance with the particular provisioning parameters, including the QoS parameters, to establish the connection between the first device and the second device.

10. The system of claim 9, wherein executing the processor-executable instructions, to provision the selected set of network interfaces and the selected set of network devices, causes the processor to establish a virtual private network (VPN) associated with the connection between the first device and the second device.

11. The system of claim 10, wherein the request is a first request, the connection is a first connection, the particular network connectivity type is a first network connectivity type, the particular set of provisioning parameters is a first set of provisioning parameters, the set of network devices is a first set of network devices, and the VPN is a first VPN, wherein executing the processor-executable instructions further causes the processor to:
receive a second request to establish a second connection between a third device and the second device, the second request including information identifying a second network connectivity type;
determine a second set of provisioning parameters, of the plurality of provisioning parameters, that is associated with the second network connectivity type;
select a second set of network devices, out of the plurality of candidate network devices, that are capable of providing the second connection according to the second set of provisioning parameters; and
provision the second set of network devices in accordance with the second set of provisioning parameters to establish the second connection between the third device and the second device via a second VPN, the second VPN being different from the first VPN.

12. The system of claim 10, wherein the request is a first request, the connection is a first connection, the particular network connectivity type is a first network connectivity type, the set of network devices is a first set of network devices, and the particular set of provisioning parameters is a first set of provisioning parameters, wherein executing the processor-executable instructions further causes the processor to:
receive a second request to establish a second connection between a third device and the second device, the second request including information identifying a second network connectivity type;
determine second provisioning parameters, of the plurality of provisioning parameters, that is associated with the second network connectivity type;
select a second set of network devices, out of the plurality of candidate network devices, that are capable of providing the second connection according to the second provisioning parameters; and
provision the second set of network devices in accordance with the second provisioning parameters to establish the second connection between the third device and the second device via the VPN.

13. The system of claim 9, wherein the particular set of provisioning parameters further identify:
an access type,
an encapsulation protocol,
traffic transmission speed, and
a communication protocol.

14. The system of claim 9, wherein the particular set of provisioning parameters identify at least four of:
traffic profile information,
the maximum quantity of routes,
load sharing information,
hub or spoke information,
the maximum prefix,
the BGP timer, or
traffic shaping information.

15. The system of claim 9, wherein the second device is associated with a cloud system.

16. The system of claim 9, wherein executing the processor-executable instructions, to select the set of network devices, causes the processor to select the set of network devices further based on network topology information identifying that one or more network devices, of the set of network devices, are of a particular type.

17. A non-transitory computer-readable medium, storing a plurality of instructions which, when executed by one or more processors associated with a device, cause the one or more processors to:
store information associating a plurality of network connectivity types with:
a plurality of sets of provisioning parameters,
a plurality of sets of types of network devices, and
a plurality of sets of types of network interfaces,
wherein each network connectivity type, of the plurality of network connectivity types, is associated with:
a respective set of provisioning parameters, of the plurality of sets of provisioning parameters,
a respective set of types of network devices, of the plurality of sets of types of network devices, and
a respective set of types of network interfaces, of the plurality of sets of types of network interfaces;
receive a request to establish a connection between a first device and a second device,
the request including information identifying a network connectivity type, of the plurality of network connectivity types;
determine a particular set of provisioning parameters, of the plurality of provisioning parameters, that is associated with the particular network connectivity type, the set of provisioning parameters including:
one or more quality of service ("QoS") parameters, and
at least three or more of the following parameters:
traffic profile information,
a maximum quantity of routes,
load sharing information,
hub or spoke information,
a maximum prefix,
a border gate protocol (BGP) timer, or
traffic shaping information;
determine a particular set of types of network devices, of the plurality of types of network devices, that is associated with the particular network connectivity type;
determine a particular set of types of network interfaces, of the plurality of types of network interfaces, that is associated with the particular network connectivity type;
select a set of network devices, out of a plurality of candidate network devices, to provision based on the network connectivity type, the selecting including:
determining that the set of network devices is capable of providing a QoS level indicated by the QoS parameters,
determining that the set of network devices includes the particular set of types of network devices that is associated with the particular network connectivity type;
select a set of network interfaces, out of a plurality of candidate network interfaces, to provision based on the particular network connectivity type, the selecting including determining that the set of network interfaces includes the particular set of types of network devices that is associated with the particular network connectivity type; and provision the selected set of network interfaces and the selected set of network devices in accordance with the particular provisioning parameters, including the QoS parameters, to establish the connection between the first device and the second device.

18. The non-transitory computer-readable medium of claim 17, wherein the instructions, to provision the selected set of network interfaces and the selected set of network devices, further cause the one or more processors to establish a virtual private network (VPN) associated with the connection between the first device and the second device.

19. The non-transitory computer-readable medium of claim 18, wherein the request is a first request, the connection is a first connection, the particular network connectivity type is a first network connectivity type, the particular set of provisioning parameters is a first set of provisioning parameters, the one or more devices are a first set of devices, and the VPN is a first VPN, wherein the plurality of instructions further cause the one or more processors to:

receive a second request to establish a second connection between a third device and the second device, the second request including information identifying a second network connectivity type;

determine a second set of provisioning parameters, of the plurality of sets of provisioning parameters, that is associated with the second network connectivity type;

select a second set of network devices, out of the plurality of candidate network devices, that are capable of providing the second connection according to the second set of provisioning parameters; and provision the second set of network devices in accordance with the second set of provisioning parameters to establish the second connection between the third device and the second device via a second VPN, the second VPN being different from the first VPN.

20. The non-transitory computer-readable medium of claim 18, wherein the request is a first request, the connection is a first connection, the particular network connectivity type is a first network connectivity type, the one or more devices are a first set of devices, and the particular set of provisioning parameters is a first set of provisioning parameters, wherein the plurality of instructions further cause the one or more processors to:

receive a second request to establish a second connection between a third device and the second device, the second request including information identifying a second network connectivity type;

determine second provisioning parameters, of the plurality of provisioning parameters, that is associated with the second network connectivity type;

select a second set of network devices, out of the plurality of candidate network devices, that are capable of providing the second connection according to the second set of provisioning parameters; and provision the second set of network devices in accordance with the second set of provisioning parameters to establish the second connection between the third device and the second device via the VPN.

* * * * *